Feb. 6, 1962     D. B. SPALDING     3,019,962

PRESSURE EXCHANGERS

Filed Jan. 26, 1959

INVENTOR
DUDLEY BRIAN SPALDING,

BY

*Larson and Taylor*

ATTORNEYS

UnitedStates Patent Office 3,019,962
Patented Feb. 6, 1962

3,019,962
PRESSURE EXCHANGERS
Dudley Brian Spalding, 2 Vineyard Hill Road,
Wimbledon, London, England
Filed Jan. 26, 1959, Ser. No. 789,043
Claims priority, application Great Britain Jan. 31, 1958
1 Claim. (Cl. 230—69)

This invention relates to pressure exchangers.

The term "pressure exchanger" is used herein to mean apparatus comprising cells in which one gas quantity expands so compressing another gas quantity with which it is in direct contact, ducting to lead gas substantially steadily to and from the cells at different pressures, and means to effect relative motion between the cells and the ducting.

According to the present invention a pressure exchanger rotor incorporates an inner cylinder, an outer cylinder spaced apart from and concentric with the inner cylinder, and a multiplicity of walls extending between and secured to the inner and outer cylinders, each wall having a bowed cross-section in any plane perpendicular to the rotor axis and subtending, in any plane normal to the rotor axis, a chord which passes through the rotor axis.

The term "bowed" as used herein is intended to mean a curve without any points of inflexion. An example of such a curve is an arc of a circle.

Preferably the walls have a radius of curvature which satisfies the condition that $h/w$ lies within the range 0.05 to 0.25 where $h$ is the maximum perpendicular distance from the wall cross-section median line to the chord of the median line and $w$ is the length of the chord of the median line. The wall cross-section may have the form of a circular arc.

Ports in a stationary structure for the admission and extraction of gas from the cells are preferably shaped to conform with the bowed construction of the leading and trailing edges of the cell walls.

Five embodiments in accordance with the invention will now be described, by way of example, with reference to the accompanying diagrammatic drawing, in which.

Figure 1:
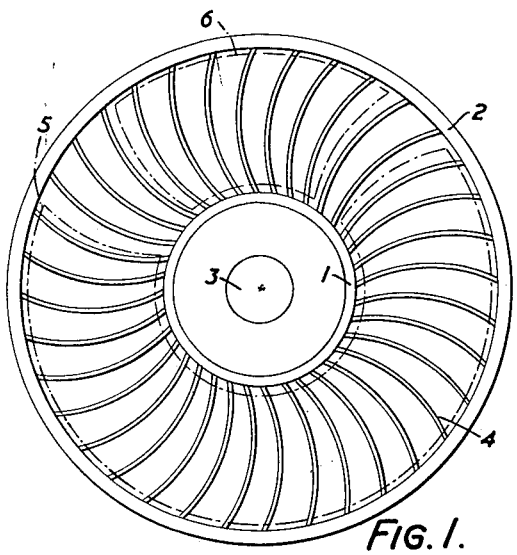
FIGURE 1 is an end view of a pressure exchanger rotor constructed in accordance with the invention.

Referring to FIGURE 1, the pressure exchanger rotor includes an inner cylinder or hub portion 1, an outer cylinder or shroud 2, and a shaft 3 on which the rotor can rotate, each of those parts having a common axis of rotation. The cells of the rotor are formed in part by a multiplicity of walls 4 which extend between and are secured to the hub portion 1 and the shroud 2. Each wall 4 is of bowed cross-section in any direction perpendicular to the general plane of fluid flow which is generally parallel to the rotor axis in the embodiment shown. A section of each bowed wall subtends, in any plane normal to the rotor axis, a chord which passes through the rotor axis. Ports 5, 6, which are formed in end-plate structure (not shown), are indicated by chain lines and the leading and trailing edges of these parts correspond in shape to the bowed leading and trailing edges of the cell walls. For convenience of manufacture the bowed cross-section is in the form of an arc of a circle.

In each of the remaining embodiments similar parts have been given the same references as the corresponding parts in FIGURE 1 and the fragmentary views shown correspond in their complete form to the FIGURE 1 embodiment.

Figure 2:
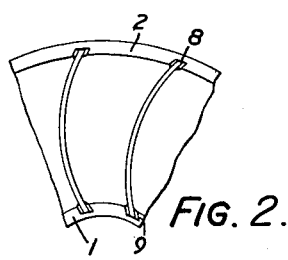
FIGURE 2 is a fragmentary end view of a pressure exchanger rotor in accordance with the invention showing the manner in which cell walls may be secured to the main rotor structure.

FIGURE 2 shows a fragment of a rotor with straight slots 8 cut in the interior surface of the shroud 2 and straight slots 9 cut in the exterior surface of the hub portion 1. During assembly of the rotor the walls are sprung into position in the slots and are subsequently secured by welding or brazing. This method of construction ensures adequate rigidity of the rotor as a whole. If, as in some cases, it is difficult or even impossible to braze or weld the walls to the shroud and the hub portion over their full length, it is desirable to ensure that only compressive forces act upon the walls 4 in order to reduce fretting during operation. Continuous compressive forces can be ensured by inserting the walls into their respective slots whilst the shroud and hub portion are not in their final positions relative to each other. After each wall has been loosely inserted in its respective slots the hub portion and shroud are rotated through a small angle relative to one another until the final relative position is reached. In this position the walls have been subjected to the required degree of pre-stressing.

Figure 3:
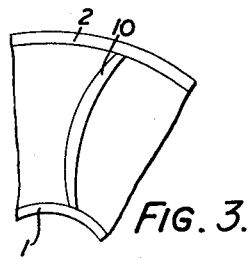
FIGURE 3 shows a fragmentary end view of a third embodiment of a pressure exchanger rotor in accordance with the invention.

In FIGURE 3, a wall 10 has one face formed in cross-section by a circle of one radius and the other face formed by a circle of a different radius. The region of the wall remote from the shroud 2 and hub portion 1 is therefore thicker than the portion adjoining the shroud and the hub portions; the wall is thus made more resistant to buckling than it would be if it had a constant thickness.

Figure 4:
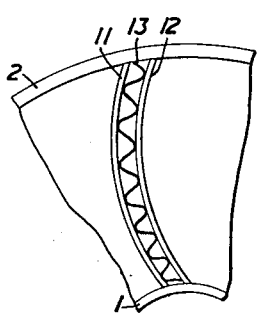
FIGURE 4 shows a fragmentary end view of a fourth embodiment of a pressure exchanger rotor in accordance with the invention.
Figure 5:
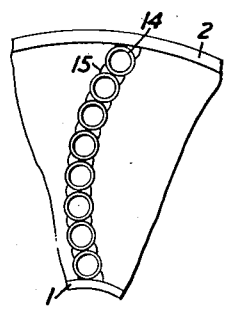
FIGURE 5 shows a fragmentary end view of a fifth embodiment of a pressure exchanger rotor in accordance with the invention.

FIGURE 4 illustrates an embodiment in which each wall includes two portions 11 and 12, the space between the two portions accommodating a thin corrugated sheet 13 which may advantageously carry a flow of coolant during operation of the pressure exchanger of which the rotor forms a part. Coolant is introduced to and extracted from the spaces formed by the corrugations through header spaces (not shown) arranged one at each axial end of the wall. The header spaces themselves communicate with a coolant supply through suitable passages (not shown) in the rotor hub and rotor shaft. In an alternative arrangement (not illustrated) the corrugations of the sheet 13 run in a direction extending away from the rotor axis and not parallel to it as shown in FIGURE 5.

The embodiment of FIGURE 5 again raises the possibility of cooling the cell walls during operation, each wall being formed by a series of tubes 14. The axes of the tubes lie on a curve, the chord of which lies in a common plane with the rotor axis. The tubes are secured together by continuous welds 15 or by brazing.

In each of the above described embodiments the curvature of each wall satisfies the condition $h/w$ lies within the range 0.05 to 0.25, where $h$ is the maximum perpendicular distance from the wall cross-section median line to the chord of the median line and $w$ is the length of the chord of the median line. The wall thickness may be calculated for each embodiment by conventional stress analysis.

By making use of any of the above described embodiments for a given material and for given operating pressures, the wall thickness can be reduced relative to conventional plane walls so reducing aerodynamic losses. By reducing the wall thickness more cells may be mounted on a given cell rotor; this permits more accurate timing of the port edges relative to the pressure waves and hence further reduces aerodynamic losses.

I claim:

A pressure exchanger rotor incorporating an inner cylinder, an outer cylinder spaced apart from and concentric with the inner cylinder, and a multiplicity of walls extending between and secured to the inner and outer cylinders to form a series of cells, each wall having a bowed cross-section in any plane perpendicular to the rotor axis and subtending, in any plane normal to the rotor axis, a chord which passes through the rotor axis.

References Cited in the file of this patent

UNITED STATES PATENTS

| | | |
|---|---|---|
| 2,675,173 | Jendrassik | Apr. 13, 1954 |

FOREIGN PATENTS

| | | |
|---|---|---|
| 438,036 | Great Britain | Nov. 11, 1935 |
| 740,597 | Great Britain | Nov. 16, 1955 |
| 784,196 | Great Britain | Oct. 2, 1957 |
| 804,528 | Great Britain | Nov. 19, 1958 |